Oct. 28, 1958 L. CAIOLI 2,857,707
DEVICE DESIGNED TO SECURE THE SUPPORT OF ALL
THE LEGS IN FURNITURE AND THE LIKE
Filed Jan. 25, 1956
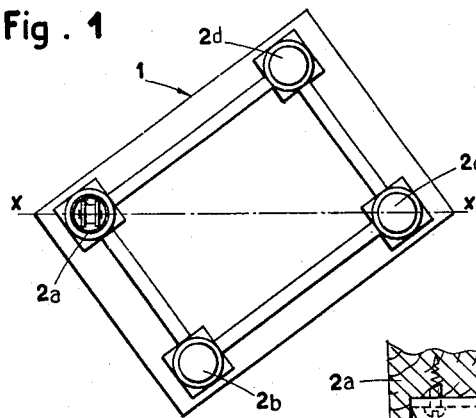
Fig. 1
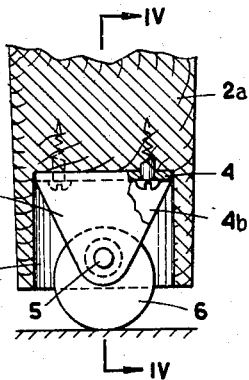
Fig. 2
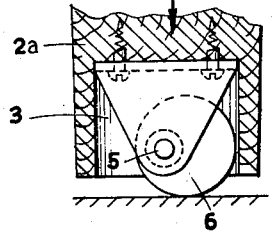
Fig. 3
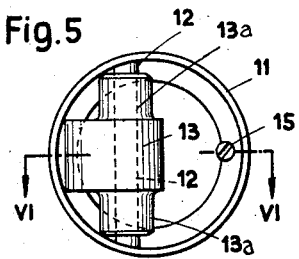
Fig. 5
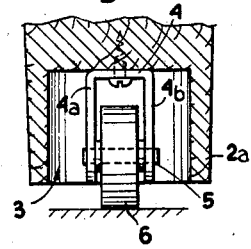
Fig. 4
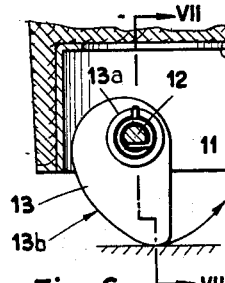
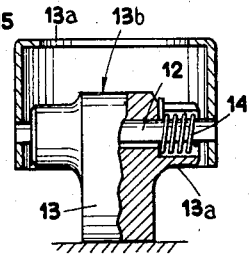
Fig. 7
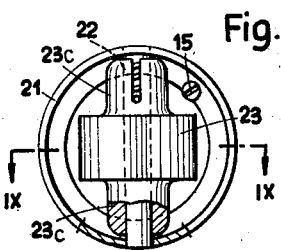
Fig. 8
Fig. 6
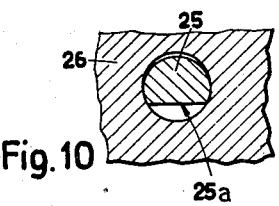
Fig. 10
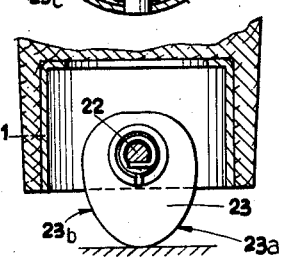
Fig. 9
INVENTOR:
LAMBERTO CAIOLI
BY
Richardson, David and Vordon
Atty's.

United States Patent Office 2,857,707
Patented Oct. 28, 1958

2,857,707

DEVICE DESIGNED TO SECURE THE SUPPORT OF ALL THE LEGS IN FURNITURE AND THE LIKE

Lamberto Caioli, Florence, Italy

Application January 25, 1956, Serial No. 561,274

Claims priority, application Italy February 2, 1955

6 Claims. (Cl. 45—139)

Furniture generally provided with four legs shows the failure of only being in conditions to lie on three legs, even if suitably manufactured, owing to the defect of the not exactly flat floors. The failure is serious especially when the use of the furniture requires it to be stationary, such as the case of furniture for working purposes, writing desks, draftsman tables, typewriting machine tables, sewing machines, etc.

The device, according to the invention, is designed to avoid these failures; it is applied to the end of one of the legs and automatically adjusts the length of said leg in order to correct the supporting or resting defect. Said device substantially includes a member angularly movable relative to a horizontal or substantially horizontal axis, mounted in a bearing applied to said leg, said angularly movable member being formed with a cam profile.

The substantially horizontal axis, around which said member is angularly movable, is substantially directed towards the diagonally opposite leg, in furniture provided with four corner legs, that is, it moves in the direction of the leg which is not adjacent to the one on which the device is applied to.

The drawing shows some embodiments, given as examples of the invention. In said drawing:

Fig. 1 diagrammatically shows bottom plan view of a rectangular piece of furniture embodying the invention;

Figs. 2 and 3 show a vertical section of a detail of the leg provided with the device according to an embodiment, and with the cam member in two different positions;

Fig. 4 shows a section taken along the line IV—IV of Fig. 2;

Figs. 5, 6 and 7 show a bottom plan view, a section taken along the line VI—VI of Fig. 5 and a section taken along the line VII—VII of Fig. 6 of a device actuated in a different way relative to that of Figs. 1 and 2;

Figs. 8 and 9 show a bottom plan view and a section taken along the line IX—IX of Fig. 8 of an additional embodiment of the device;

Fig. 10 shows a section of a pin applicable to the device in any of its embodiments.

1 generically denotes, in the drawing (Fig. 1), the furniture which is provided with four corner legs 2a, 2b, 2c, 2d. The device is applied in the leg 2a and is oriented in such a way that the axis, around which the angular displacements of the cam member occur, is substantially the axis X—X between the supporting point of the leg 2a and that of the leg 2c which is diagonally opposite to the leg 2a. The leg 2a, designed to receive the device, is provided with a bed or end seat 3.

According to Figs. 2 to 4, a bearing 4 provided with fins 4a, 4b, which hold a pin 5, is fixed in the bed 3; said pin 5 movably and angularly links an eccentric wheel 6, forming the cam member, between the fins 4a, 4b. This wheel may be moved at least 180° around the pin 5 from the position shown in Fig. 2, being limited by its abutment against the wall of the recess 3.

The pin 5 is located in such a position with respect to the end of the leg 2a that the plane determined by the feet of the other three legs 2b, 2c, 2d, tangentially passes the eccentric wheel 6 when this wheel is substantially located in the median position (Fig. 3) between that of Fig. 2 and the opposite one. Then even if the floor is uneven and one of the four supporting points is out of the plane of the other three—from a portion or from the other portion of said plane—in an amount not exceeding the eccentricity of the wheel 6, the furniture will find a stable position. For this purpose, the operation is as follows: the furniture is lifted from the floor so that the wheel 6 on leg 2a assumes the lowest position shown in Fig. 2, by action of gravity owing to its own weight or to a resilient member which acts between the wheel and a portion fixed to the leg; by slowly lowering the furniture, the wheel touches the floor and in the conditions of unstable equilibrium (see Fig. 2) tends to keep both feet of the adjacent legs 2b, 2d, displaced from the floor; by changing this position with small horizontal angular displacements of the furniture around the support or rest formed by the leg 2c, the wheel rotates on the pin 5 and allows the lowering of the furniture in correspondence of the leg 2a, as far as also the two adjacent legs 2b, 2d will lie on the floor; in this position, the friction offered by the support of the legs 2b, 2d prevents an additional rotation of the furniture around the support of the leg 2c. On the other hand, the wheel 6 offers a determined resistance to the rotation owing to the friction between said wheel and the floor and between the wheel and the pin. The eccentricity and diameter of the wheel 6 therefore will have such a ratio as to secure the stability of the furniture; the dimensions of the wheel and thus of the device are small, since the corrections are very small.

According to Figs. 5 to 7, 11 denotes a bearing—which in the embodiment is tubular—housed in the bed 3 in a determined stable angular position and carries a pin 12. Said pin is slightly displaced with respect to the diametrical center of the bearing. The cam member 13, provided with hubs 13a and having its body portion 13b shaped, approximately for ¾ of its angular development according to a spiral, more particularly a logarithmic spiral or to a functionally equivalent spiral, is mounted on the pin 12. One or body of said hubs 13a is cut in order to form a housing for a corresponding helical spring 14 which is secured at one end to the pin 12 and at the other end either to the hub 13a, or to the member 13. The spring 14 or each spring 14 is arranged in such a way as to carry, in the rest condition, the downwardly abutting member 13, as in Fig. 6. The tubular support 11 is secured in the angular position required, for example by a screw 15.

A similar rolling friction of the cam on the floor is attained through a logarithmic spiral profile, in any position of the member 13.

According to Figs. 8 and 9, a diametral pin 22 is mounted in a tubular bearing 21, similar to the one denoted by 11, and a cam member 23 is angularly movable on said pin 22; as a variation to the embodiment of Figs. 5 to 7, the member 23 is shaped with two spiral profiles 23a, 23b, one radial to the other and symmetrical with respect to a geometrical axis which is perpendicular to the oscillating axis; the cam 23 is also provided with hubs 23c.

According to Fig. 10, the pin 25 which holds the cam member 26 adapted to be, actuated in any way, for example by any of the illustrated actuations, is made with a cutaway portion or bevel 25a in the lower portion; in this way the over-all friction between the cam member 26 and the pin 25 is increased, without modifying the easiness with which the cam member may be angularly moved on said pin, when owing to the load said member presses from the bottom towards the top on the pin adjacently to said cutaway portion.

A spring or any other resilient means may be provided other than the embodiment of Figs. 5 to 7, also in any other embodiment.

In any embodiment, the profiled surface of the cam member contacting the floor may be worked or coated in order to offer a high coefficient of friction.

The drawing only shows some embodiments of the invention, which may be varied in the forms and arrangements.

What I claim is:

1. In a piece of furniture having four corner legs, a furniture levelling device including a support, a pivot pin on said support, said pin providing a bottom facet, said support being applied to one of said legs with said pin in alignment with the leg diagonally disposed to said one leg, a cam member freely rotatable on said pin and having two active profiles constituting part of two geometrical helixes substantially symmetrical with respect to a geometric axis transversely disposed with respect to said pin and constituting a projecting portion of said pin, a coil spring surrounding said pin and reacting between said pin and said cam member to move said cam member so that the projecting portion is directed downwardly.

2. In a piece of furniture having four legs, a furniture levelling device including a support, a pivot pin on said support, said pin having a lower facet, said support being applied to one of said legs with said pin in alignment with the leg diagonally disposed to said one leg, a cam member freely rotatable on said pin and having two active profiles constituting part of two geometrical helixes, substantially symmetrical with respect to a geometric axis transversely disposed with respect to said pin and constituting a projecting portion of said pin, said cam member being automatically oriented so that the projecting portion is directed downwardly.

3. In a piece of furniture having four corner legs, a furniture levelling device including a support, a pivot pin on said support, said pin providing a bottom facet, said support being applied to one of said legs with said pin in alignment with the leg diagonally disposed to said one leg, a cam member freely rotatable on said pin and having a portion projecting from said pin, a coil spring surrounding said pin and reacting between said pin and said cam member to move said cam member with the projecting portion directed downwardly.

4. In a piece of furniture having four corner legs, a furniture levelling device including a support, a pivot pin on said support, said support being applied to one of said legs with said pin in alignment with the leg diagonally disposed to said one leg, a cam member freely rotatable on said pin and having a portion projecting from said pin, said cam member being automatically oriented with the projecting portion directed downwardly.

5. An article of furniture comprising a table with four corner legs, one of said legs having a socketed recess axially disposed in the free end thereof, an inverted U-shaped bearing member secured in said recess, a pin supported across the space between the legs of said bearing member and a cam wheel rotatably mounted on said pin between said legs, said cam wheel having two active profiles constituting part of two geometrical helixes substantially symmetrical with respect to a geometric axis transversely disposed relative to said pin.

6. An article of furniture comprising a table with four corner legs, one of said legs having a socketed recess axially disposed in the free end thereof, an inverted U-shaped bearing member secured in said recess, a pin supported across the space between the legs of said bearing member and a cam wheel rotatably mounted on said pin between said legs, said cam wheel having two active profiles constituting part of two geometrical helixes substantially symmetrical with respect to a geometrical axis transversely disposed relative to said pin, said pin being arranged with its longitudinal axis in line with the leg diagonally opposed thereto, said pin being cutaway along its bottom to provide a bottom facet for increasing the friction when load thrusts are exerted upwardly.

References Cited in the file of this patent

UNITED STATES PATENTS

| | | |
|---|---|---|
| 2,054,977 | Herve | Sept. 22, 1932 |
| 2,055,715 | Barker | Sept. 29, 1936 |
| 2,281,769 | Hochrjem | May 5, 1942 |
| 2,285,656 | Herold | June 9, 1942 |

FOREIGN PATENTS

| | | |
|---|---|---|
| 69,725 | Denmark | Aug. 8, 1949 |
| 80,509 | Switzerland | Sept. 25, 1918 |